C. WILLIAMS.
FISHING FLOAT.
APPLICATION FILED JULY 19, 1909.

987,522.

Patented Mar. 21, 1911.

Witnesses
C. C. Richardson
C. A. Hines

Inventor
Claude Williams,
By Victor J. Evans
Attorney

UNITED STATES PATENT OFFICE.

CLAUDE WILLIAMS, OF ST. LOUIS COUNTY, MISSOURI.

FISHING-FLOAT.

987,522.

Specification of Letters Patent.   Patented Mar. 21, 1911.

Application filed July 19, 1909.   Serial No. 508,396.

*To all whom it may concern:*

Be it known that I, CLAUDE WILLIAMS, a citizen of the United States, residing at 6213 Ridge avenue, in the county of St. Louis and State of Missouri, have invented a new and useful Fishing-Float, of which the following is a specification.

This invention relates to fishing floats, and its object is to provide a float which may be readily applied to, released from and adjusted along the line, and embodies a novel construction of fastener for clamping it to the line.

The invention consists of the features of construction, combination and arrangement of parts hereinafter fully described and claimed, reference being had to the accompanying drawing, in which:—

Figure 1:
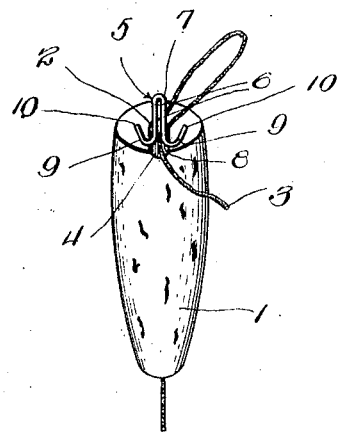
Figure 2:
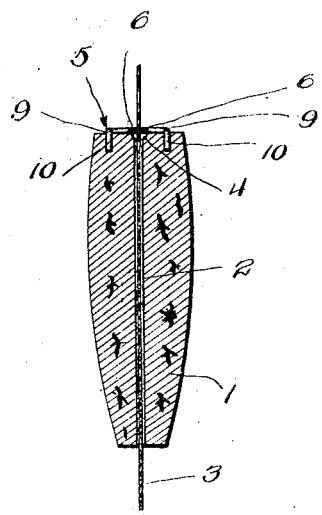
Figure 3:
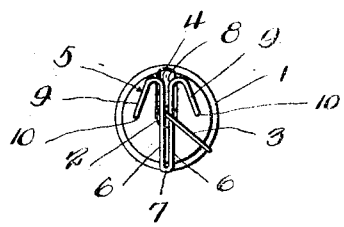

Figure 1 is a perspective view of the float illustrating the first step in passing a flexible line therethrough. Fig. 2 is a vertical section through the float, showing it clamped to the line. Fig. 3 is a top plan view of the same.

Referring to the drawing, 1 designates a float of any suitable size and shape and made of wood or other suitable material. This float is provided with a longitudinal bore 2 for the passage of the fishing line 3. The float is formed at its upper end or top with a radial groove 4 extending from the bore 2 outwardly to one of the sides of the float.

Mounted upon the top of the float is a line fastener 5 formed of a single piece of spring wire. The wire is bent to provide a pair of substantially parallel line clamping arms 6 projecting diametrically across the top of the float and above the groove 4, the central portion of said wire being arranged in the form of a bight or loop 7 connecting the clamping arms at their rear ends. The forward ends of the clamping arms 6 are bent outwardly in diverging relation to provide a flaring entrance 8 to the space between the arms, whereby the insertion of the line 3 between the said arms is facilitated. From such point the arms are outwardly and rearwardly turned in divergent relation to provide anchoring members 9 terminating at their free ends in downwardly bent anchoring points 10 which are driven into the top of the float and thereby serve to hold the fastener in position.

It will be observed from the foregoing description that the clamping arms extend over the bore 2 and radial groove 4 and are slightly elevated above the surface of the top of the float, this construction facilitating the application of a light or very flexible line, as hereinafter explained.

In applying the float to a comparatively coarse or stiff line, the free end of the line is entered beneath the clamping arms and through the radial groove 4 until it enters the bore 2, when it may be fed downward the desired distance to properly position the float upon the line, after which by drawing the portion of the line adjacent the fastener inwardly between the arms 6, the float will be firmly clamped in position. Where the line is comparatively light or slender and not sufficiently stiff to be fed downward through the bore in the manner above described, the end of the line is first inserted into the groove 4 and beneath the forward ends of the clamping arms 6 and then threaded laterally through the space between one of said clamping arms and the top of the float, the free end of the line being then grasped and drawn outwardly until a loop or slack portion of sufficient length is produced, when the free end of the line is inserted into and fed downward through the bore 2, after which the line may be engaged with the fastener in the manner previously explained by grasping the loop and the outer part of the line. This mode of operation is illustrated in Fig. 1. To release the float from the line, it is simply necessary to grasp the float and hold the line adjacent the fastener, and to then impart relative sidewise movement so as to withdraw the line from engagement with the fastener.

It will thus be seen that a simple and inexpensive construction of float and fastener may be provided whereby the float may be firmly held in position upon the line and may be adjusted along the line as occasion requires and released from the line in a simple and expeditious manner.

Having thus described the invention what I claim as new is:—

A fishing float comprising a float body having a flat top, a central longitudinal bore for the passage of the line, and a radial groove in said top extending between said bore and one of the sides of the body, and a fastener mounted upon the top of the float and formed of a single piece of wire, said fastener comprising a pair of parallel clamping arms extending diametrically across the flat top of the body above the groove and bore and spaced from the top of the body, said arms being connected at one end and having their opposite ends diverging to form a flaring entrance to the space between the arms arranged adjacent the outer end of the groove, the extremities of the wire being bent outwardly and backwardly from said divergent ends at an oblique angle to the arms and formed with downturned portions embedded in the body on opposite sides of the line of the groove.

CLAUDE WILLIAMS.

Witnesses:
W. F. KLEIN,
B. G. WHITNEY.